United States Patent
Li et al.

(10) Patent No.: US 12,547,870 B2
(45) Date of Patent: *Feb. 10, 2026

(54) OPTIMIZATION OF MEMORY USE FOR EFFICIENT NEURAL NETWORK EXECUTION

(71) Applicant: Cypress Semiconductor Corporation, San Jose, CA (US)

(72) Inventors: Kaiping Li, Randolph, NJ (US); Aidan Smyth, Milpitas, CA (US); Ashutosh Pandey, Irvine, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1091 days.

This patent is subject to a terminal disclaimer.

(21) Appl. No.: 17/552,719

(22) Filed: Dec. 16, 2021

(65) Prior Publication Data

US 2023/0043584 A1    Feb. 9, 2023

Related U.S. Application Data

(60) Provisional application No. 63/231,158, filed on Aug. 9, 2021.

(51) Int. Cl.
*G06N 3/04* (2023.01)
*G06F 9/54* (2006.01)

(52) U.S. Cl.
CPC .............. *G06N 3/04* (2013.01); *G06F 9/544* (2013.01)

(58) Field of Classification Search
CPC .................................. G06F 9/544; G06N 3/04
See application file for complete search history.

(56) References Cited

U.S. PATENT DOCUMENTS

| | | | | |
|---|---|---|---|---|
| 2009/0087119 A1* | 4/2009 | Dorrell | ................ | G06T 3/4007 382/264 |
| 2010/0214936 A1* | 8/2010 | Ito | ......................... | G06N 3/045 370/252 |
| 2014/0282180 A1* | 9/2014 | Orofino | ................... | G06F 8/314 715/771 |
| 2016/0266934 A1* | 9/2016 | Rimoni | ................ | G06F 3/0659 |

FOREIGN PATENT DOCUMENTS

| | | | | |
|---|---|---|---|---|
| CN | 112445688 A | * | 3/2021 | .......... G06F 11/3476 |
| CN | 114880393 A | * | 8/2022 | ............. G06F 16/22 |
| CN | 115328850 A | * | 11/2022 | ......... G06F 12/0806 |

OTHER PUBLICATIONS

English translation of CN-112445688-A (Year: 2021).*
English translation of CN-114880393-A (Year: 2022).*
English translation of CN-115328850-A (Year: 2022).*

* cited by examiner

*Primary Examiner* — Henry Tsai
*Assistant Examiner* — John B Roche

(57) ABSTRACT

Implementations disclosed describe methods and systems to perform the methods of optimizing a size of memory used for accumulation of neural node outputs and for supporting multiple computational paths in neural networks. In one example, a size of memory used to perform neural layer computations is reduced by performing nodal computations in multiple batches, followed by rescaling and accumulation of nodal outputs. In another example, execution of parallel branches of neural node computations include evaluating, prior to the actual execution, the amount of memory resources needed to execute a particular order of branches sequentially and select the order that minimizes this amount or keeps this amount below a target threshold.

20 Claims, 9 Drawing Sheets

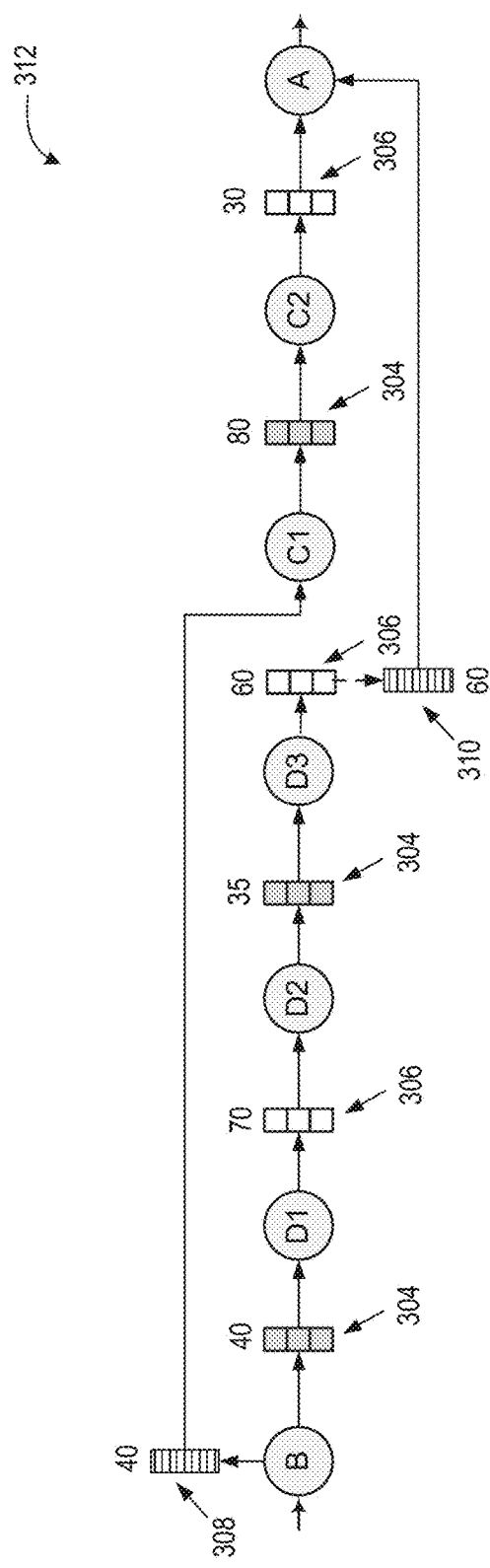
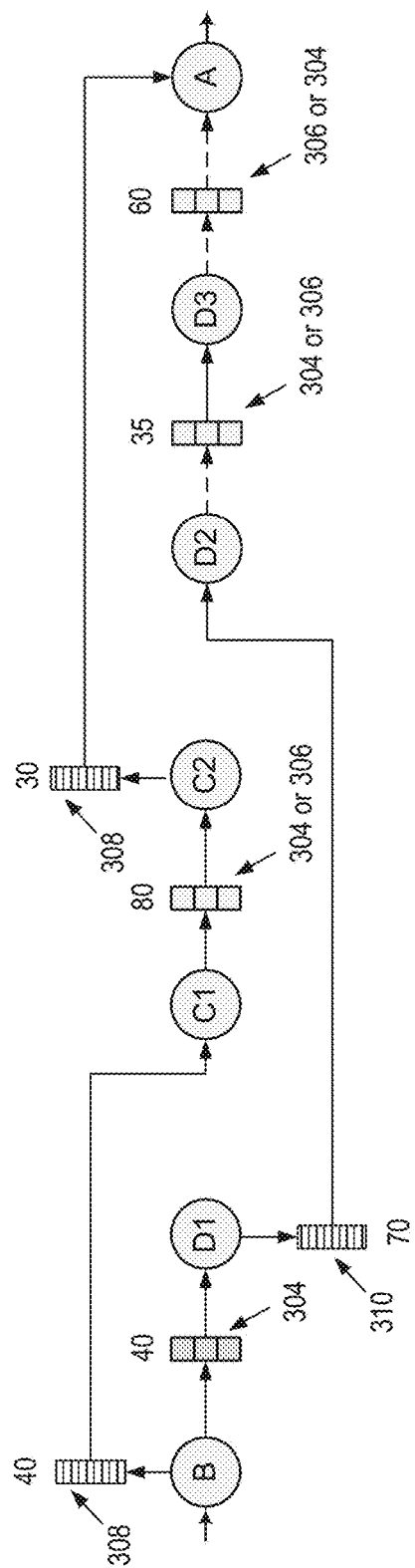
FIG. 3C
FIG. 3D

OPTIMIZATION OF MEMORY USE FOR EFFICIENT NEURAL NETWORK EXECUTION

RELATED APPLICATIONS

This application claims the benefit of U.S. Provisional Application No. 63/231,158, filed Aug. 9, 2021, the entire contents of which is being incorporated herein by reference.

TECHNICAL FIELD

The instant disclosure pertains to optimization of memory resources used to support execution of machine learning models; more specifically, to minimizing a size of memory used for accumulation of neural node outputs and for supporting multiple computational paths in residual neural networks.

BACKGROUND

Edge computing is a type of a distributed computing in a cloud-based or server-based computing environment, where at least a portion of data processing occurs closer to a periphery of the environment where collection or consumption of data takes place. An edge device can be a computing device of relatively modest processing and memory capabilities and can have access to local data (e.g., via connected sensory devices, an Internet-of-Things, or IoT, network) and to a cloud service. Instead of uploading local data as input into the cloud service and then receiving a processing output from the cloud service, the edge device can in some instances process the local data using its own processor and memory resources. Even though the cloud service can be capable of processing the local data faster than the edge device, limitations of the network bandwidth can negate cloud processing gains. Local processing can have additional advantages, such as responding in real-time to changing conditions, reducing the computational load of the cloud service, decreasing network traffic, eliminating exposure of sensitive data to adversarial attacks, and so on.

BRIEF DESCRIPTION OF THE DRAWINGS

FIGS. 3A-F are schematic depictions of various candidate orders of execution of an example portion of a neural network with parallel branches, in accordance with some implementations of the present disclosure.

DETAILED DESCRIPTION

Figure 1:
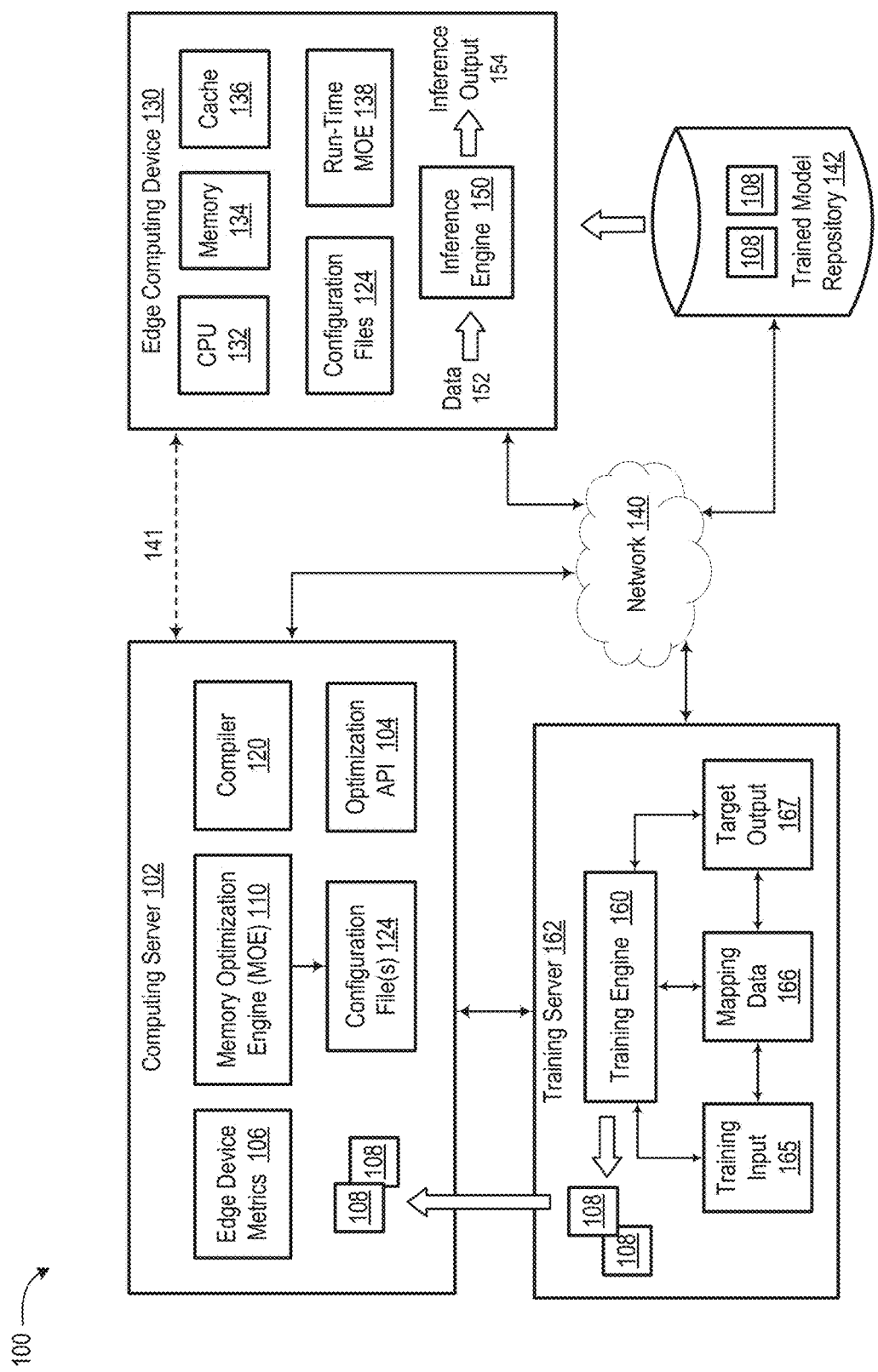
FIG. 1 is a block diagram of an example architecture of a computing environment that supports memory-optimized deployment of one or more machine learning models, in accordance with some implementations of the present disclosure.

Modern networks may connect together computing devices of very diverse processing capabilities. For example, a technological (e.g., manufacturing) line may include hundreds (or more) of wireless sensors connected to a local area network (LAN) and/or a personal area network (PAN). Groups of sensors may be served by a local (edge) processing device, such as a microcontroller unit (MCU). Multiple MCUs may be connected to a local processing device, e.g., a workstation, which in turn may be communicating with a corporate data center and/or a cloud service supported by a super-computing facility. In some instances, one or more processing devices in this processing hierarchy may be executing machine learning algorithms, e.g., as part of environmental monitoring, quality control of input materials and/or product yield, and so on. Machine learning models (MLMs) may be developed and trained on high-power computers and then deployed on low-power MCUs. For example, various MLMs, including neural networks, may be trained on a computing server to recognize motion, objects, speech, etc., and then deployed on MCUs that support surveillance cameras, voice-user interfaces, and so on.

An edge device may have a limited amount of high-speed memory (cache, buffers, etc.) to support neural node computations of a neural network (NN), which may include a large number of neurons, arranged in layers. Each neuron may be processing multiple input values, e.g., initial inputs into the NN or intermediate outputs of previous layers. The processing may include computing a sum of multiplication products of input values and weights adding a bias, and applying an activation function. Storing simultaneously all output values of a neural network may require large accumulator (scratch) memory (also referred to as buffers herein). For example, input values $I_j$ and weights $W_j$ that are n-bit numbers stored in the integer number format may result in products $I_j W_j$ that are 2n-bit numbers. Each addition of another 2n-bit number potentially increases the size of the sum (accumulator) by 1 bit. As a result, accumulating a sum of P weighted input values and a bias, $I_1 W_1 + I_2 W_2 + \ldots + I_P W_P + B$, requires an accumulator buffer that has at most 2n+P bits (if bias value is a 2n bit number). In implementations involving microcontrollers or limited-resources digital signal processing (DSP) devices, the calculated output values are usually stored in a sufficiently wide bit length register (called accumulator register), a e.g. 32-bit or 36-bit register. If accumulator register bit length is not large enough, special handling such as saturation protection or downscaling may be applied. In many networks, at least some of the nodes may process a significant number of input and output values, e.g., nodes of fully-connected layers, nodes of convolutional layers with large or multiple kernels (filters), etc. This may force a developer to outfit edge devices with large memory buffers, which may be impractical or expensive.

Some NN, e.g., residual NNs, may include skip connections, which reach over one or more layers of neurons to provide data to more distant layers, e.g., to provide data from m-th layer to m+2-th layer (m+3-th layer, etc.). Some of the skipped connections (also referred to as branches herein) may further involve one or more intermediate nodes or layers of computations before merging with other nodes/layers of the NN resulting in different parallel branches (paths) connecting the same nodes. A large-scale computing device can perform computations of different branches concurrently, e.g., using parallel processing. A limited-resources edge device, however, may have to perform computations of different branches sequentially, choosing which branch to compute first before returning to the remaining branch(es), while temporarily holding data, e.g., in scratch buffers, that is necessary for execution of the remaining branch(es). The edge device can choose the order of branch execution randomly or according to some predetermined metric (e.g., the longest or shortest branch first). Such an order of execution, however, can result in suboptimal utilization of memory buffers with large maximum (peak) demand for buffer space from nodes having a large number of inputs but underutilization of the buffer space during off-peak operations of other nodes.

Aspects and implementations of the present disclosure address these and other limitations of the existing technology by enabling systems and methods that facilitate memory-optimized execution of NNs on various devices. For brevity, a deployment platform is often referred to as an edge device herein, but it should be understood that various disclosed implementations and optimization techniques may be used on all computers including computers that have substantial processing and memory resources, e.g., server computing devices, cloud computing devices, and the like.

In one instance, execution of parallel branches of neural node computations may include evaluating, prior to the actual execution, the amount of memory resources needed to execute a particular order of branches sequentially and select the order that minimizes this amount or keeps this amount below a target threshold. For example, branch execution may be supported by at least two buffers that serve as alternating input and output buffers into consecutive layer of nodes, with one buffer storing outputs of odd-numbered layers and inputs into even-numbered layers and another buffer storing outputs of even-numbered layers and inputs into odd-numbered layers. Additional scratch buffers, whose number may depend on the number of parallel branches being executed, may be used to hold data that awaits execution. Because the size of the buffers required for execution is determined by the maximum demand for the size of a particular buffer, the order in which the buffers are utilized may depend on the order of execution of the branches. For example, if each of m branches is fully executed (with a possible exception of the last branch aggregation node) before a next branch is started, there may be m! (m factorial) different execution orders. Additional options may include interrupting a particular branch before it is fully executed, storing intermediate data for the interrupted branch, executing one or more other branches (or portions of branches) before resuming the execution of the interrupted branch. Various such orders of branch execution may be evaluated as described in the instant disclosure and a selection of the optimal (or otherwise acceptable) order can be made.

Additionally, accumulation of a layer output that includes N output values may be performed in M batches, each batch including N/M (or fewer) output values. Each batch may require a scratch (or accumulation) buffer of a size that is significantly smaller than required to hold all output values of the layer. After a given batch is computed, its output values may be rescaled to an integer number format having fewer bits than the initial output values. Since the initial outputs may, potentially, have any number of bits up to 2n+P bits, rescaling a number of bits available for storing the rescaled output values in an output buffer may involve scaling factors that are determined at run-time (during processing of the inference data) based on the specific values of (initial) outputs of a particular neuron layer. The scaling factors may be compensated for in the next neuron layer, in one of the subsequent layers, or at the final layer of the NN. Furthermore, different layers of neurons may have a different number of outputs N that may be divided among a different number M of batches. Additionally, inputs into (and, correspondingly, outputs of) different layers may have different numbers of bits n. As a result, a size of a scratch buffer sufficient to support computations of a particular layer may be different from the scratch buffer size for other layers. A global scratch buffer size may then be selected as the maximum-sized buffer sufficient to support multiple (e.g., all) layers. The number of batches M used in computation of other layers may then be adjusted, e.g., reduced, to decrease a computational overhead (e.g., number of cycles) that is used for processing of those other layers.

Numerous other variations of the above optimization techniques are disclosed herein. The disclosed implementations have advantages that include, but not limited to, optimization of use and size of memory devices that support deployment of neural networks on various computing platforms, including edge devices with limited computational and memory resources.

FIG. 1 is a block diagram of an example architecture of a computing environment 100 that supports memory-optimized deployment of one or more machine learning models, in accordance with some implementations of the present disclosure. As depicted in FIG. 1, computing environment 100 may include a computing server 102. Computing server 102 is depicted as a single block, but it should be understood that any components of computing server 102 may be implemented on (or shared among) any number of computing devices and/or on a cloud. Computing server 102 may be a desktop computer, a laptop computer, a smartphone, a tablet computer, a server, a computing device that accesses a remote server, a computing device that utilizes a virtualized computing environment, a gaming console, a wearable computer, a smart TV, and so on. A user of computing server 102 may have a local or remote (e.g., over a network) access to computing server 102. Computing server 102 may have (not shown in FIG. 1) any number of central processing units (CPUs) and graphical processing units (GPUs), including virtual CPUs and/or virtual GPUs, or any other suitable processing devices capable of performing the techniques described herein. Computing server 102 may further have (not shown in FIG. 1) any number of memory devices, network controllers, peripheral devices, and the like. Peripheral devices may include various sensing devices, photographic cameras, video cameras, microphones, scanners, or any other devices for data intake. Computing environment 100 may also include an edge computing device 130 interactively coupled to computing server 102, e.g., via a network 140 or a direct connection 141. Edge computing device 130 may be instantiating and executing one or more MLMs that may be optimized by computing server 102.

In some implementations, a computing server 102 may include a number of engines and components for efficient MLM optimization and deployment. Interaction of computing server 102 with edge computing device 130 may be facilitated by an optimization application programming interface (API) 104, which may facilitate collection of edge device metrics 106 associated with edge computing device 130. Collected edge device metrics 106 may include various data characterizing computational resources of edge computing device 130, such as a number and type(s) of CPU(s) 132, CPU(s) clock rate(s), number of hardware threads per CPU 132, size of data operands that can be processed by various hardware threads of CPU 132, size of available memory 134, cache 136 (including buffers and/or other high-speed cache), and the like. In some implementations, processing and memory resources of edge computing device 130 may be distributed among two or more separate devices connected via a local network (not shown). In such instances, edge device metrics 106 may further include network bandwidth of the local network, throughput, latency, packet loss rate, and so on.

Memory optimization engine (MOE) 110 may have access to edge device metrics 106 and one or more trained MLMs 108. An output of MOE 110 may be used by a compiler 120 to compile an executable code, libraries, and device configuration files for execution of MLM 108 on edge computing device 130. MOE 110 may access architecture and parameters of trained MLM(s) 108, e.g., a number of neural layers and number of neurons (computational nodes) of MLM(s) 108, a number of incoming/outgoing neural connections (edges) for each node, weights associated with each edge, biases and activation functions associated with each node, and so on. As used herein, a layer should be understood as any set of operations that may be performed in parallel regardless of how such operations are actually being performed (e.g., in parallel, sequentially, and/or as some combination thereof). For example, operations performed on a set of input data (e.g., partitioned among multiple neurons) by various neurons may represent one layer, operations performed on the output of that layer may represent another layer, and so on. A neuron may represent any set of computations that takes two or more input numbers and produces an output number (e.g., via weight multiplication, bias addition, application of an activation function, etc.).

Figure 2A:
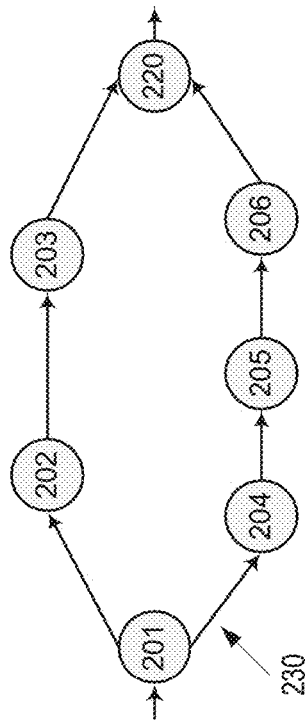
FIGS. 2A-D illustrates example topologies of portions of a neural network that include two or more parallel branches, in accordance with some implementations of the present disclosure.
Figure 2B:
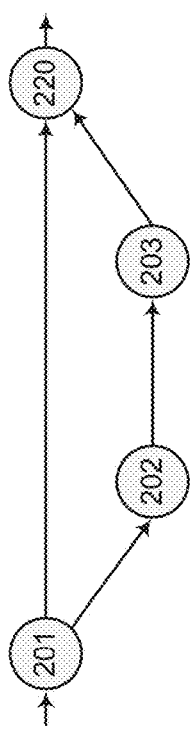
Figure 2C:
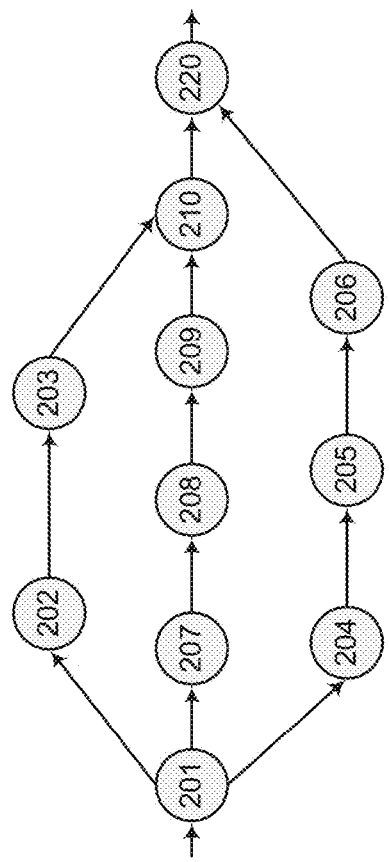
Figure 2D:
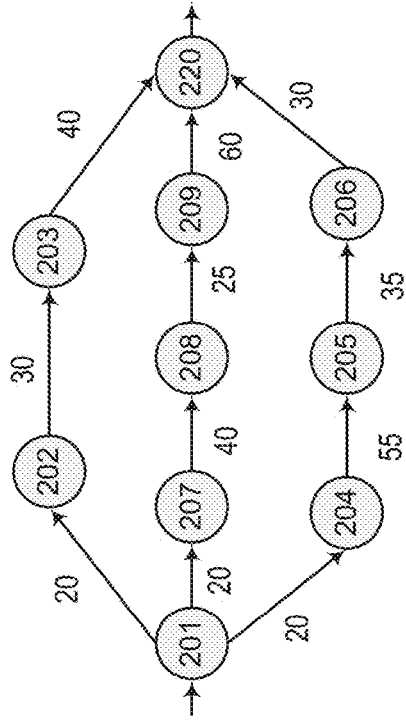

Based on the accessed architecture and parameters of trained MLM(s) 108, MOE 110 may identify one or more portions of the neural network of the MLM(s) 108 that include parallel branches. FIGS. 2A-D illustrates example topologies of portions of a neural network that include two or more parallel branches, in accordance with some implementations of the present disclosure. Parallel branches may extend between any nodes of the network, referred to herein as a branching node and an aggregation node. An output of a branching node 201 serves as an input into two or more nodes of different branches whereas an aggregation node 220 takes inputs from multiple branches. FIG. 2A illustrates two branches with one branch being a skipping connection branch that connects branching node 201 directly with aggregation node 220 and the other branch having two intermediate nodes 202 and 203. FIG. 2B illustrates two branches where both branches have intermediate nodes, e.g., a branch with two intermediate nodes 202 and 203 and a branch with three intermediate nodes 204, 205, and 206. FIG. 2C illustrates three parallel branches, with intermediate nodes 207, 208, and 209 added to the topology of FIG. 2B. FIG. 2D illustrates topology that includes an intermediate aggregation node 210. An intermediate aggregation node may terminate one or more (but fewer than the total number) of the branches prior to a (final) aggregation node 220. Similarly (although not shown in FIGS. 2A-D), a topology of branches may include an intermediate branching point, which splits off additional branches from one of the branches.

Various branches depicted in FIGS. 2A-D include edges (depicted with arrows) connecting the nodes. Edges represent data output by one or more nodes of a previous layer that is used as an input into one or more nodes of a subsequent layer. It should be understood throughout this disclosure, that each of the nodes 201-220 (even though depicted with a single circle) may be a compound node that includes multiple nodes and the respective edges may be component nodes that include multiple neural connections. For example, node 201 in FIG. 2B may be a compound node that comprises N simple nodes, node 204 may be another compound node that comprises M simple nodes, and edge 230 may be a compound edge that comprises up to N×M simple edges connecting pairs of simple nodes. Similarly, each of nodes 201, 202, 203, 205, 206, and 220, may be a compound node. On the other hand, simple nodes of compound node 202 have no connections with simple nodes of compound nodes 204, 205, and 206. As a result, operations of the nodes 201-202-203 may be performed independently from operations of the nodes 201-204-205-206. Computations of the final edges leading to the aggregation node 220 may be performed last, after all other edges have been processed.

MOE 110 may identify the topology of nodes and edges and may further identify (or estimate) an amount of data to be processed by each node and delivered (over a respective edge) to the next node. As described in more detail below, MOE 110 may then determine the order of execution of different nodes (or compound nodes) that minimizes capacity requirements for various memory buffers. In some implementations, as illustrated with reference to FIG. 2C, the order of execution may be identified as follows. MOE 110 may determine that each edge of the topology of FIG. 2C is associated with a certain amount of data, as indicated by a corresponding numeral in FIG. 2C. For example, number 30 next to the edge between nodes 202 and 203 indicates that 30 Kb of data is output by node 202 and is input into node 203.

In those implementations, e.g., where data output by each node of a branch is retained until the execution of that branch is completed, each branch may require as much memory as the sum of all edge values of the respective branch. For example, the top branch (201-202-203-220) may require 20 Kb+30 Kb+40 Kb=90 Kb of memory, the middle branch (201-207-208-209-220) may require 145 Kb of memory, and the bottom branch (201-204-205-206-220) may require 140 Kb of memory. The amount of memory that is freed after execution of a branch is the sum of all edge values with the excepting of the last edge of the branch. The branches may be executed in the reverse order of freed memory. For example, after execution of operations of top branch 201-202-203, 50 Kb of memory is freed (20 Kb+30 Kb), after execution of middle branch 201-207-208-209, 85 Kb of memory is freed, and after execution of bottom branch 201-204-205-206, 110 Kb of memory is freed. As a result, the selected order of execution may be: 1) the bottom branch, 2) the middle branch, 3) the top branch.

In this example, 180 Kb of memory would be used to support all operations of FIG. 2C. More specifically, 140 Kb would be used to execute the bottom branch; 110 Kb of 140 Kb would then be freed when the execution of the bottom branch is compete (with 30 Kb still storing the output of the bottom branch); 35 Kb of additional memory (145 Kb–110 Kb) would then be needed to execute the middle branch.

Next, 85 Kb of 145 Kb would be freed after the execution of the middle branch (with 60 Kb still storing the output of the middle branch); and 5 Kb of additional memory (90 Kb–85 Kb) would then be needed to execute the top branch. Accordingly, 180 Kb (140 Kb+35 Kb+5 Kb) would be used for the optimal execution order.

In contrast, if the order of execution were selected as 1) middle branch, 2) bottom branch, 3) top branch, then 85 Kb of 145 Kb would be freed after execution of the middle branch (with 60 Kb still storing the output of the middle branch); 55 Kb of additional memory (140 Kb–85 Kb) would then be needed to execute the bottom branch and 110 Kb freed after the execution of the bottom branch would be sufficient to execute the top branch and store its output. Accordingly, 200 Kb (145 Kb+55 Kb) would be required for this suboptimal execution order.

In some implementations, further optimization may be achieved by reusing memory that stores intermediate outputs of a given branch, before the execution of the branch is complete. For example, during execution of the middle branch, when node 209 operations are competed, the memory storing 40 Kb of output of node 207 may be overwritten with some of the outputs of node 209, so that only 20 Kb (60 Kb–40 Kb) of additional memory may be needed. In such implementations, a smaller total amount of memory may be used to support parallel branch processing, as described in more detail below in conjunction with FIGS. 3A-F.

Having evaluated various candidate execution orders and selected the optimal order, MOE 110 may store the selected order as part of configuration file(s) 124. Configuration file(s) 124 may specify allocation of memory buffers of a size that is sufficient to store outputs of various neuron layers (e.g., consecutive layers), reusing memory portions once values stored therein have been processed, and so on. Additionally, MOE 110 may optimize use of integer number formats for various nodes and layers, as described in more detail below in conjunction with FIGS. 3A-B. In some implementations, any part of optimization of the parallel branch execution and/or the number format optimization may be performed on run-time MOE 138 that is operating on edge computing device 130.

Configuration file(s) 124, generated by MOE 110, may include settings and templates that are specific to the edge computing device 130 and may define how execution of a code (e.g., generated by compiler 120) of the MLM(s) 108 may be implemented on edge computing device 130. Configuration file(s) 124 may be passed (together with the code) to edge computing device 130 for execution by inference engine 150. In some implementations, configuration file(s) 124 may be made available to a user (e.g., developer), via optimization API 104. Optimization API 104 may represent configurations of the compiled MLM(s) 108 in a format that is accessible to a user. In some instances, the user may then change the architecture of MLM(s) 108 or an order of execution of the parallel branches of the MLM(s) 108.

Training (and retraining) of MLM(s) 108 may be performed by a training server 162. In some implementations, training server 162 may be a part of computing server 102. In other implementations, training server 162 may be communicatively coupled to computing server 102 directly or via network 140. Training server 162 may be (and/or include) a rackmount server, a router computer, a personal computer, a laptop computer, a tablet computer, a desktop computer, a media center, or any combination thereof. Training server 162 may include a training engine 160. During training (or retraining), training engine 160 may generate and configure one or more MLMs 108. MLM(s) 108 may include regression algorithms, decision trees, support vector machines, K-means clustering models, neural networks, or any other machine learning algorithms. Neural network MLMs may include convolutional, recurrent, fully connected, Long Short-Term Memory models, Hopfield, Boltzmann, or any other types of neural networks. Generating MLMs may include setting up an MLM type (e.g., a neural network), architecture, a number of layers of neurons, types of connections between the layers (e.g., fully connected, convolutional, deconvolutional, etc.), the number of nodes within each layer, types of activation functions used in various layers/nodes of the network, types of loss functions used in training of the network, and so on. Generating MLM(s) 108 may include setting (e.g., randomly) initial parameters (weights, biases) of various nodes of the networks. The generated MLM(s) may be trained by training engine 160 using training data that may include training input(s) 165 and corresponding target output(s) 167. Association of training input(s) 165 with correct target output(s) 167 may be identified by mapping data 166. During training of MLM(s) 108, training engine 160 may identify patterns in training input(s) 165 based on desired target output(s) 167 and train the respective MLM(s) to perform the desired tasks. Trained MLM(s) 108 may then be validated using additional training (validation) input/target output associations not previously seen by MLM(s) 108.

Trained MLMs 108 may be stored in a trained model repository 142, which may be accessible to computing server 102 and edge computing device 130. In some implementations, after optimization and compiling of MLM(s) 108 is performed for edge computing device 130 (e.g., by computing server 102), corresponding code, libraries, and configuration file(s) 124 may be stored in a trained model repository 142 and accessed (e.g., downloaded) by edge computing device 130 at or prior to running one or MLMs 108. Trained model repository 142 may be a persistent storage capable of storing trained MLMs 108. Trained model repository 142 may be hosted by one or more storage devices, such as main memory, magnetic or optical storage based disks, tapes or hard drives, NAS, SAN, and so forth. Although depicted as separate from training server 162, in some implementations, trained model repository 142 may be a part of training server 162. In some implementations, trained model repository 142 may be a network-attached file server, while in other implementations, trained model repository 142 may be some other type of persistent storage such as an object-oriented database, a relational database, and so forth, that can be hosted by a server machine or one or more different machines accessible to the training server 162 via network 140.

In an example deployment scenario, one or more of MLMs 108 may be trained on training server 162 and provided to computing server 102 for compiling and optimization for a target-specific platform, e.g., edge computing device 130. Trained model parameters, codes, libraries, and configuration file(s) 124 may then be provided to edge computing device 130. An inference engine 150 on edge computing device 130 may access configuration file(s) 124 and configure execution of MLMs 108 using settings in the configuration file(s) 124. The settings may specify handling of memory store and read operations, and various other optimizations operating in accordance with the present disclosure. Some of the optimizations, e.g., dynamic integer format optimization may be performed by run-time MOE 138 on edge computing device 130. The deployed and optimized MLMs 108 may be used by inference engine 150 to process application-specific (inference) data 152 and produce inference output 154. Inference output 154 may include any classification output of MLM(s) 108, e.g., object recognition output, object type classification output, voice recognition output, speech recognition output, technological control output, security output, data handling output, or any other applicable output.

Various memory optimizations that may be used in deploying and executing MLM(s) 108 will now be described in detail in relation to FIGS. 3-4. Although for specificity, the optimizations may be described as being performed for use on edge computing device 130, the same or similar techniques may also be used for optimization of memory use on any other computing devices, including workstations, servers, cloud computers, and any other computing devices.

Figure 3A:
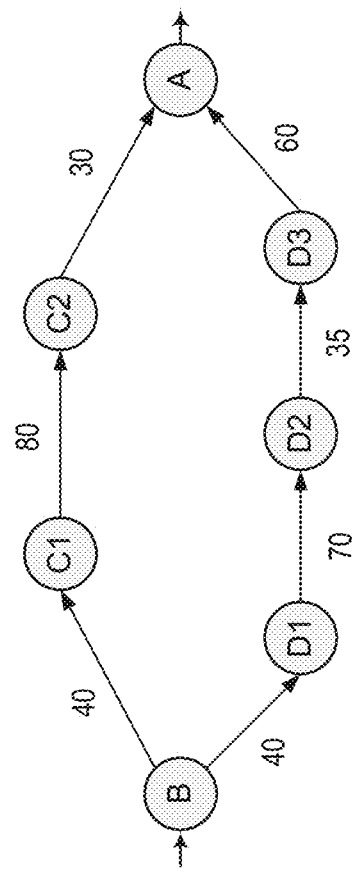

FIGS. 3A-F are schematic depictions of various candidate orders of execution of an example portion of a neural network with parallel branches, in accordance with some implementations of the present disclosure. FIG. 3A illustrates an example topology 300 of parallel branches. For conciseness, FIG. 3A illustrates two parallel branches having seven nodes (or compound nodes), but optimization techniques described herein may be applied to any number of parallel branches having any number of nodes. A top branch includes intermediate nodes C1 and C2 connecting a branching node B and an aggregation node A. A bottom branch includes intermediate nodes D1, D2, and D3 connecting the same branching node B and aggregation node A. Numbers next to the edges connecting a pair of nodes indicate size of data propagating along the respective edges, e.g., as indicated, node C1 outputs 80 Kb of data that is input into node C2.

Figure 3B:
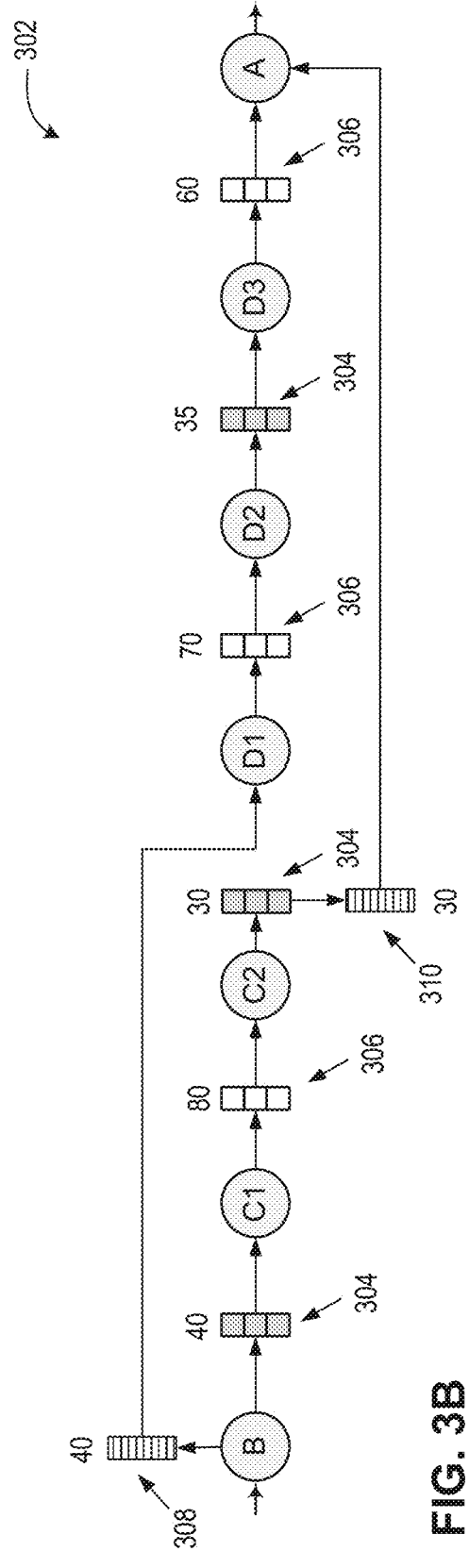

FIG. 3B illustrates one possible order 302 of sequential execution of the parallel branches depicted in FIG. 3A, in accordance with some implementations of the present disclosure. Sequential execution illustrated in FIG. 3B begins with the execution of (a part of) the top branch B-C1-C2-A before performing operations of the bottom branch B-D1-D2-D3-A. Sequential execution depicted in FIG. 3B deploys two operational buffers, a first buffer 304 (indicated with a stack of shaded squares) and a second buffer 306 (indicated with a stack of white squares), and two scratch buffers, a first scratch buffer 308 and a second scratch buffer 310. First buffer 304 and second buffer 306 may be used for alternating storage of outputs of even-numbered and odd-numbered nodes of the branches being executed. More specifically, as depicted in FIG. 3B, a first copy of output of branching node B may be stored in first buffer 304 and a second copy of the same output may be stored in first scratch buffer 308. The output of node C1 is then stored in second buffer 306 and the output of node C2 is again stored in first buffer 304 (overwriting the output of branching node B). The output of node C2 may also be copied (e.g., from first buffer 304) to a second scratch buffer 310 while the operational buffers are used to execute the bottom branch B-D1-D2-D3-A. As depicted, input into node D1 is retrieved from first scratch buffer 308, and the output of node D1 is stored in second buffer 306 before being input into node D2. Similarly, output of node D2 is stored in first buffer 304 and then input into node D3 whose output is again stored in second buffer 306. The input into aggregation node A is then taken from second buffer 306 and second scratch buffer 310. As a result, the order 302 of sequential execution shown in FIG. 3B includes storing the following amounts of data in the operational buffers and scratch buffers.

First buffer 304: 40 Kb, 30 Kb, 35 Kb;
Second scratch buffer 306: 80 Kb, 70 Kb, 60 Kb;
First scratch buffer 308: 40 Kb,
Second scratch buffer 310: 30 Kb.

The minimum combined size of all four buffers is, therefore, 190 Kb, being equal to the sum 40 Kb+80 Kb+40 Kb+30 Kb of the maximum amounts of data stored in each buffer.

FIG. 3C illustrates an alternative order 312 of sequential execution of the parallel branches of FIG. 3A, in accordance with some implementations of the present disclosure. Sequential execution depicted in FIG. 3C begins with the execution of (a part of) the bottom branch B-D1-D2-D3-A before performing operations of the top branch B-C1-C2-A. More specifically, as depicted in FIG. 3C, a first copy of the output of branching node B is stored in first buffer 304 and a second copy of the same output is stored in first scratch buffer 308. The output of node D1 is stored in second buffer 306, the output of node D2 is stored in first buffer 304, and the output of node D3 is again stored in second buffer 306 and may also be copied (e.g., from second buffer 306) to a second scratch buffer 310 while the operational buffers are then used to execute the top branch B-C1-C2-A. As depicted, input into node C1 is retrieved from first scratch buffer 308, the output of node C1 is stored in first buffer 304 and is then input into node C2. Output of node C2 is stored in second buffer 306 and is then input into aggregation node A together with the input from second scratch buffer 310. As a result, the order 312 of sequential execution shown in FIG. 3C includes storing the following amounts of data in the operational buffers and scratch buffers.

First buffer 304: 40 Kb, 35 Kb, 80 Kb;
Second buffer 306: 70 Kb, 60 Kb, 30 Kb;
First scratch buffer 308: 40 Kb;
Second scratch buffer 310: 60 Kb.

The minimum combined size of all four buffers is, therefore, 250 Kb, being equal to the sum 80 Kb+70 Kb+40 Kb+60 Kb of maximum amounts of data stored in each buffer. Accordingly, order 312 requires 60 Kb more memory than order 302. Order 302 may, therefore, be use for the actual deployment of the neural network on an edge computing device.

Different variations of the above techniques may be performed, in some implementations. For example, FIG. 3B and FIG. 3C illustrate storing all output data generated by various nodes in operational buffers even when some of the data is then also stored in scratch buffers. For example, the output data of node C2 of FIG. 3B is first stored in second buffer 306 before being stored in second scratch buffer 310, and the output data of node D3 in FIG. 3C is first stored in first buffer 304 before being stored in second scratch buffer 310. In some implementations, MOE 110 (or run-time MOE 138) may configure the neural network execution with the output data being stored directly in the scratch buffers when operations of all nodes of a particular branch (except the aggregation node) are being processed or when execution of a branch is temporarily terminated (as illustrated in FIG. 3D below).

In some implementations, after a data is loaded from a scratch buffer, the operations of the neural network may choose any operational buffer for the next data store operation. For example, after execution of the second branch in FIG. 3B is started with input data into node D1 loaded from first scratch buffer 308, the output of node D1 may be stored in first buffer 304 (rather than in second buffer 306, as shown). Similarly, in FIG. 3C, after the input data is loaded from first scratch buffer 308 into node C1, the output of node C1 may be stored in second buffer 306 (rather than in first buffer 304). MOE 110 (or run-time MOE 138) may include all such possibilities when evaluating parallel branch execution for maximum memory efficiency. In some instances, such a change of an operational buffer may improve efficiency, or may reduce efficiency, or may leave it unchanged. For example, with reference to FIG. 3B, storing an output of node D1 in first buffer 304 (instead of second buffer 306, as shown) would reduce efficiency of executing B-C1-C2 branch first (causing the minimum size of first buffer 304 to increase from 40 Kb to 70 Kb without reducing the minimum size, 80 Kb, of second buffer 306), but may improve efficiency of executing B-D1-D3 branch first (causing the minimum size of first buffer 304 to decrease from 80 Kb to 40 Kb but only increase the minimum size of second buffer 306 from 70 Kb to 80 Kb). In this example, memory efficiency of executing B-C1-C2 branch first (190 Kb) still remains higher than memory efficiency of executing B-D1-D3 branch first (200 Kb), but in various other networks the global maximum efficiency may be affected by the choice of the operational buffer used to store output data following loading of data from a scratch buffer.

While FIGS. 3B-C illustrate a complete execution of a selected branch (except for operations of the aggregation mode) before processing another branch, in some implementations, MOE 110 (or run-time MOE 138) may additionally evaluate various possible orders of execution that include incomplete branch execution.

FIG. 3D illustrates one possible order 322 of sequential execution of the parallel branches with temporary branch interruption, in accordance with some implementations of the present disclosure. As depicted in FIG. 3D, after execution of branch B-D1-D2-D3-A is started and operations of node D1 are complete, the output of node D1 may be stored in second scratch buffer 310 and operations of nodes C1 and C2 are performed using input from first scratch buffer 308. In some implementations, output of node C1 may be stored in first buffer 304 or second buffer 306. After operation of node C2 are complete (and the output stored in first scratch buffer 308) execution of the first branch B-D1-D2-D3-A may be completed. In some implementations, MOE 110 (or run-time MOE 138) may weigh increased efficiency of memory utilization (if so enabled by interrupted branches) against the increased complexity of handling additional writes/reads into/from scratch buffers.

Figure 3E:
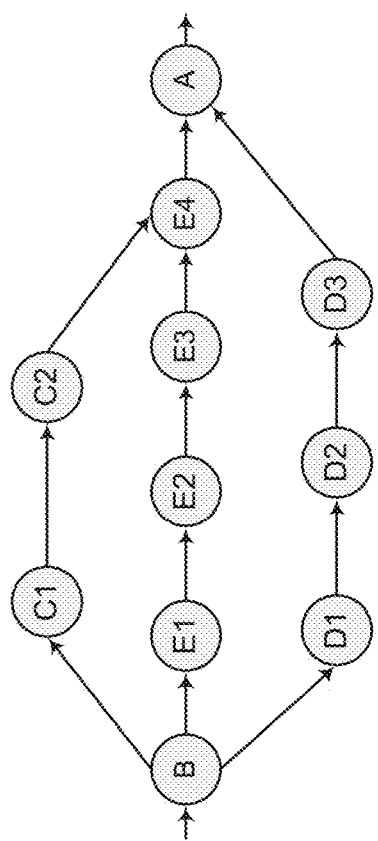
Figure 3F:
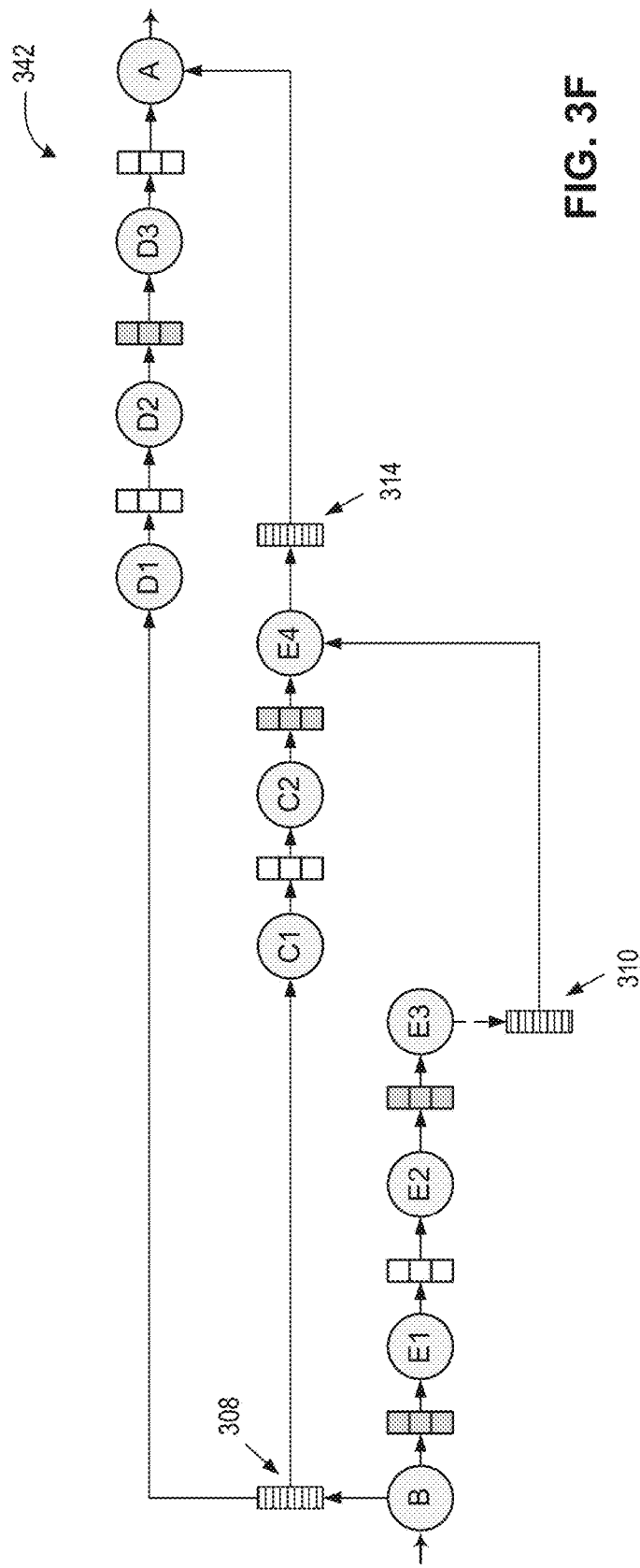

FIG. 3E illustrates an example topology 332 of a portion of a neural network with three parallel branches. Example topology 332 includes additional branch B-E1-E2-E-3-E4-A that includes an intermediate aggregation node (node E4) at which the number of branches is reduced. FIG. 3F illustrates one possible order 342 of sequential execution of three parallel branches of FIG. 3E, in accordance with some implementations of the present disclosure. Sequential execution depicted in FIG. 3F begins with the execution of the nodes B-E1-E2-E3 of the middle branch, followed by nodes C1-C2-E4 of the top branch, and then nodes D1-D2-D3-A. The execution is supported with three scratch buffers 308, 310, and 314. MOE 110 (or run-time MOE 138) may evaluate the candidate order depicted in FIG. 3F for example topology 332 together with various other possible orders. For the network shown in FIG. 3E, such possible orders may also include five other orders of execution of the three branches (for a total of 3!=6 such possible orders) as well as any number of orders where one or more branches are temporarily interrupted, as described in relation to FIG. 3D.

Figure 4:
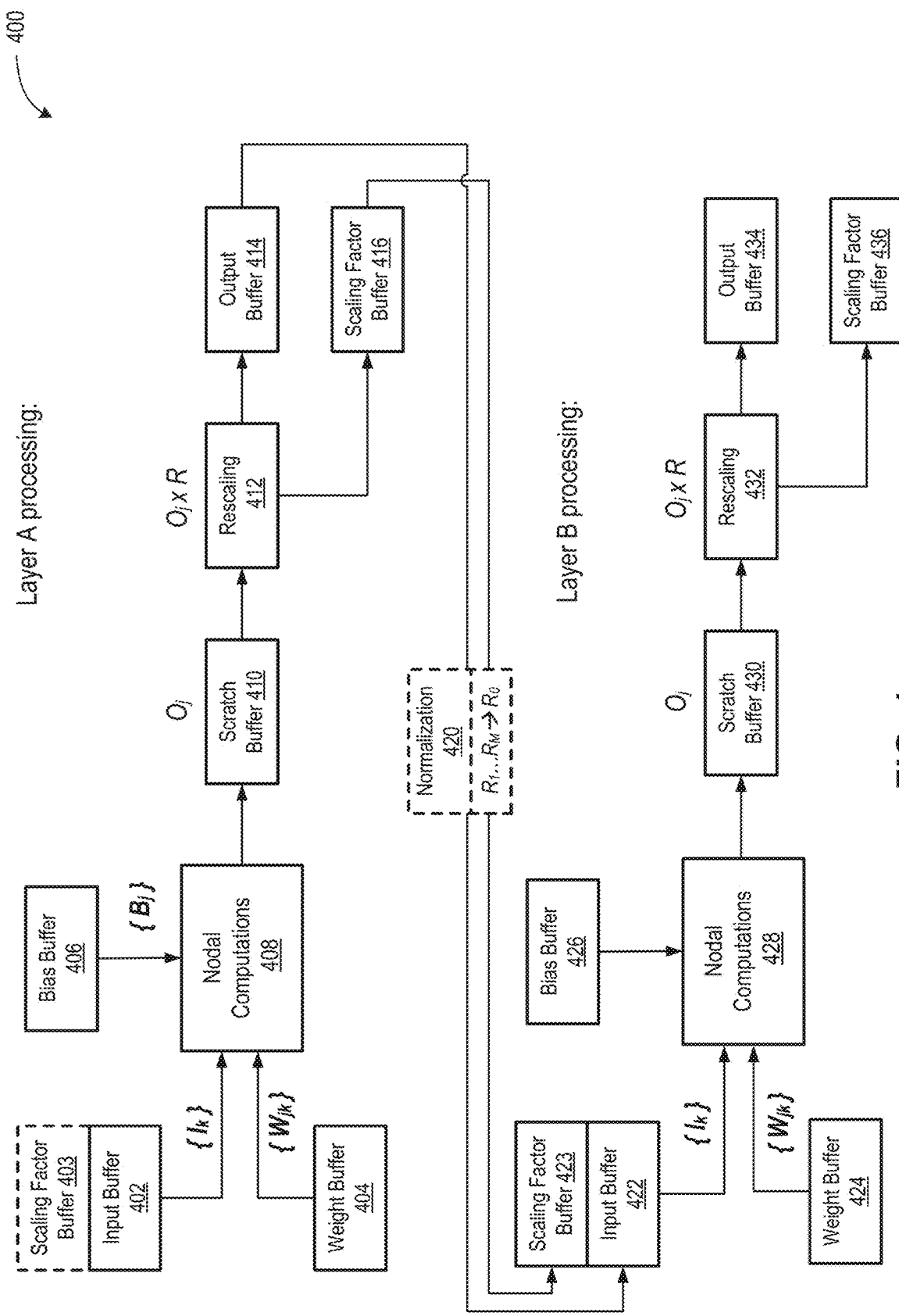
FIG. 4 illustrates neural processing with accumulation of output values for optimization of the size of memory buffers that support neural network operations, in accordance with some implementations of the present disclosure.

FIG. 4 illustrates neural processing 400 with accumulation of output values for optimization of the size of memory buffers that support neural network operations, in accordance with some implementations of the present disclosure. Implementations disclosed in relation to FIG. 4 may be used in neural networks of arbitrary architecture, including neural networks with parallel branches, described in conjunction with FIGS. 2-3, as well as any other types of neural networks, such as convolutional neural networks, fully-connected neural networks, and so on. Neural processing 400 may include receiving or accessing input values $I_1, I_2, \ldots, I_S$, which may be inputs into the neural network or outputs of one of previous layers of the neural network. The inputs may be weighted with weights associated with different nodes of a particular layer of nodes to obtain the outputs $O_1, O_2, \ldots O_N$ of the layer:

$$O_j = B_j + \sum_{k=1}^{S} W_{jk} I_k,$$

where $W_{jk}$ is a weight with which k-th input contributes to j-th output, and $B_j$ is a bias value added to j-th output. The input values may be stored in input buffer 402, the weights may be stored in weight buffer 404, and biases may be stored in bias buffer 406. Buffers 402-406 may be (or include) any one or a combination of operational buffers, scratch buffers, or any other suitable memory devices. Nodal computations 408 may process the input values, $I_2, \ldots I_S$, to obtain the outputs $O_1, O_2, \ldots O_N$. In some implementations, the input values may be in an integer value format of k bits, e.g., k=32 bits, 16 bits, 8 bits, or any other suitable number of bits. Weights may have the same (or different) number of k bits and biases may have 2k bits (or any other number of bits). In some implementations, weights may have a number of bits that is different from the number of bits of the input values.

Each output value may be w bits long and may initially be stored in an accumulator register. To fit all outputs of the nodal computations 408 a storage (e.g., scratch buffer 410) of up to n'=Nw bits may be used. In some implementations, to reduce the number of bits of a buffer that (temporarily) stores the computed output values, nodal computations 408 may be performed in M batches. For example, the number M of batches may be a number of features or channels of the specific layer (e.g., red, green, blue pixel channels in image processing) or may be determined by the MOE 110. Top portion of FIG. 4 illustrates neural processing 400 for one of the neural network layers, e.g., layer A. For example, the first N/M output values $O_1, O_2, \ldots O_{N/M}$ may be computed and stored in a scratch buffer 410, which may have n'/M=N$_W$/M (or more) of bits. In some instance, the last batch may have fewer output values than M, e.g., when N is not divisible by M. In one implementation, the rescaled outputs of different batches have the same bit length. In other implementations, rescaled outputs of some batches may be different from rescaled outputs of other batches. The first output batch, $O_1, O_2, \ldots O_{N/M}$, may then undergo rescaling 412 using a scaling factor $R_1$ and stored in an output buffer 414: $O_j R_i \to \tilde{O}_j$, where for the first batch i=1, and j∈[1, N/M]. Similarly, each of the remaining M−1 output batches may be processed similarly using scaling factors $R_2, \ldots R_M$ and the total of N output values $\tilde{O}_1, \tilde{O}_2, \ldots \tilde{O}_N$ stored in output buffer 414 (e.g., each under a separate memory address or in a concatenated fashion) at the completion of the operations of the neural layer (e.g., layer A). Additionally, M scaling factors $R_1, R_1, \ldots R_M$ may be stored in a scaling factor buffer 416 for use in the neural operation of the next layer (e.g., layer B).

In some implementations, rescaling may be performed using a static scaling factor R determined by the size of output buffer 414. For example, if output buffer 414 has m bits, each rescaled output value $\tilde{o}_j$ stored in output buffer 414 may be up to m/N bits long (e.g., 32 bits, 16 bits, 8 bits, 4 bits, etc.). Since each output value $O_j$ may be up to Nw bits long, the static scaling factor may be $R=2^{-l}$, where l=w−m/N. The static scaling factor R may be decided based on training or test data. Scaling may further be accompanied by clipping or rounding (e.g., to the nearest integer value) and may be performed by bit-shifting to the right and discarding l least significant bits. Non-power-2 scaling factors may be also used, in some implementations. The static scaling factor, R may be precomputed by MOE 110 (or run-time MOE 138) on computing server 102 during configuration of the neural network and may be stored as part of configuration file(s) 124.

In some implementations, rescaling may be dynamic and may depend on the input values received by the neural network during the inference stage. More specifically, while the static scaling factor, computed as described above, may be sufficient to store all possible rescaled output values, in some instances (e.g., of small input values), the application of the static scaling factor may result in small value in accumulator register, hence the rescaled output values may not fully utilize bit length allocated in output buffer 414. In such instances, a smaller compression ($R>2^{-l}$) may allow for a more efficient (e.g., more precise) representation of the output values by the available bits (e.g., m) of output buffer 414). To implement a dynamic compression, rescaling 412 may include evaluation of the size of output values $O_j$ (and/or input values $I_k$) and determining a respective scaling factor $R_j$ individually for each output batch.

After rescaled output values are stored in output buffer 414 and corresponding scaling factors are stored in scaling factor buffer 416, run-time MOE 138 may apply the scaling factors to the subsequent layer(s) of the neural network. Bottom portion of FIG. 4 illustrates neural processing for a subsequent layer of neurons, e.g., layer B. More specifically, rescaled output values stored in output buffer 414 may be used as input values into the next neuron layer. In some implementations, input buffer 422 for layer B may be the same as output buffer 414 for layer A. Similarly, and scaling factor buffer 423 for layer B may be the same as scaling factor buffer 416 of layer A. Similar to neural processing of layer A, neural processing of layer B may include retrieving input values from input buffer 422, scaling factors from scaling factor buffer 423, weights from weight buffer 424, biases from bias buffer 426, and performing nodal computations 428. Nodal computations 428 may compute output values for layer B, which may be stored in scratch buffer 430 followed by rescaling 432, which may be performed substantially as described above in conjunction with FIG. 4, and storing new rescaled outputs in output buffer 434 and new scaling factors in scaling factor buffer 436. In some implementations, scratch buffer 410 of layer A can be reused as scratch buffer 430 of layer B. The process described above may then continue for subsequent layers of the neural network, e.g., with output buffer 434 and scaling factor buffer 436 providing inputs into the next neuron layer (e.g., layer C). In some implementations, input and output buffers (and respective scaling factors buffers) may alternate between different (e.g., odd and even) layers. For example, output buffer 434 for layer B may be the same as input buffer 402 for layer A, and scaling factor buffer 436 for layer B may be the same as scaling factor buffer 403 for layer A.

In some implementations, nodal computations 428 of layer B may compensate for the fact that different batches of rescaled output values of layer A have different scaling factors $R_1, R_2 \ldots R_M$. For example, nodal computations 428 may be configured to compute outputs $OO_l = \Sigma_j W_{lj} O_j + B_l$ using, as input, the unrescaled output values $O_j$ of layer A. To obtain the correct outputs $OO_l$ using the rescaled outputs $\tilde{o}_j$ of layer A, nodal computations 428 may first rescale the weights $W_{ij}$ using a respective scaling factor $R_j$ associated with a batch to which j-th output $O_j$ of layer A belongs: $W_{lj} \rightarrow \tilde{W}_{lj} = W_{lj} \cdot R_j^{-1}$. The nodal computations 428 may then compute the output values of layer B by applying the rescaled weights to the rescaled inputs (outputs of layer A): $OO_l = \Sigma_j \tilde{W}_{lj} \tilde{o}_j + B_l$. In another implementation, the nodal computations 428 may first perform multiplications and partial summations $\Sigma_{j \in Batch} W_{lj} \tilde{o}_j$ for a given batch of the rescaled output values $\tilde{o}_j$ and then apply the scaling factor associated with the batch before adding the bias value. In yet another implementation, the nodal computations 428 may first perform individual multiplications $W_{lj} \tilde{o}_j$ and then apply the associated rescaling factor prior to summation over different values of j. The obtained outputs stored temporarily in scratch buffer 430 may then undergo rescaling 432, with the process repeated for any subsequent layer(s).

In some implementations, weights of layer B are not rescaled. Instead, as depicted with an optional (indicated with dashed box) normalization 420 (which may be performed by run-time MOE 110), different scaling factors may be normalized to the same scaling factor $R_A$, e.g., $R_1, R_2 \ldots R_M \rightarrow R_A$, and each output value of layer A may be rescaled again (normalized), e.g., $\tilde{o}_j \rightarrow \tilde{o}_j R_A / R_j$ where $R_j$ is the scaling factor associated with a batch to which the corresponding j-th batch output of layer A belongs. In some implementations, the scaling factor $R_A$ may be the smallest scaling factor among $R_1, R_2 \ldots R_M$ (so that the normalization 420 does not increase the total number of bits stored in output buffer 414). For example, if scaling factors $R_1, R_2 \ldots R_M$ are power-of-two scaling factors, normalization 420 may be performed by bit-shifting (multiplication by $R_A / R_j$) by the number of bits to the right that is equal to $\log_2 (R_j / R_A)$ bits. The computation of the output values $OO_l = \Sigma_j W_{lj} O_j \tilde{B}_i$ of layer B may then be performed using unrescaled weights (but may use resealed biases, $B_l \rightarrow \tilde{B}_l = B_l R_A$). Additional scaling factors $R_B, R_C \ldots$ may further be used during computations of subsequent layers B, C . . . . In some implementations, normalization 420 may be performed at the final (classifier) layer of the neural network, e.g., prior to using the Softmax function. Similarly, normalization 420 may be performed before any non-linear activation function is used.

In the instances where nodal computations 408 and/or 428 involve an activation function, the activation function may be applied before rescaling 412 or combined with rescaling 412 into a single operation. The activation function may also be applied after rescaling 412 and before normalization 420 by performing activation function computations in batches. The activation function may also be applied after normalization 420 or combined with normalization 420 into a single operation.

In some implementations, during configuration of the neural network deployment, MOE 110 may traverse the entire neural network to determine an optimal number of batches M for different layers. For example, for some layers, the size of scratch buffer 410 may have to be larger than a certain minimum, e.g., determined by a large size n of input values into the layer and/or weights of the layer (the large size being used for precision of computations). Some layers may have a large number of outputs N that may make it inefficient to have a large number of batches M due to the cost of additional computational cycles that would have to be used for processing of a large number of batches. Correspondingly, MOE 110 may determine a minimum size $S_j$ of scratch buffer 410 for optimal execution of each (e.g., j-th) layer of the neural network and then select a maximum value, $\max\{S_j\}$, as the global size of scratch buffer 410 to be used for deployment of the neural network. In determining the sizes $S_j$ of minimum scratch buffers 410 for different layers, MOE 110 may also take into account any other suitable buffers that may be shared across different layers, including but not limited to accumulation buffer 414. In some implementations, MOE 110 may weigh a reduction in size of scratch buffers gained by increased number of batches M against increased computational costs of additional cycles needed to perform M-batch computations of each layer and the network as a whole. For example, a set of empirically determined cost coefficients (or nonlinear cost functions) may be used to compare the costs of increased cycle complexity against the reduced size of scratch buffer.

Figure 5:
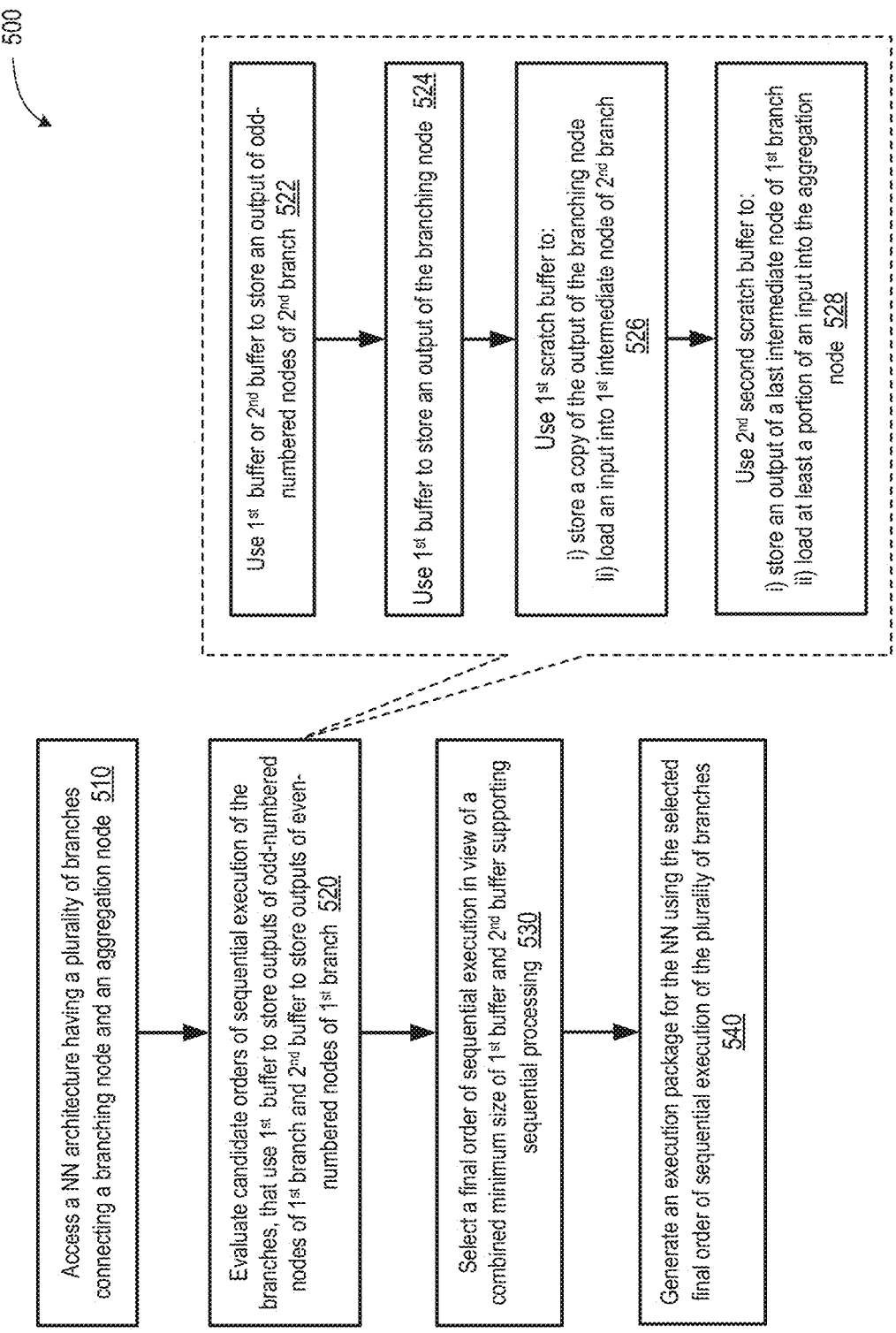
FIG. 5 is a flow diagram of an example method of deploying one or more neural networks for memory-optimized execution of parallel branches of neural connections, in accordance with some implementations of the present disclosure.
Figure 6:
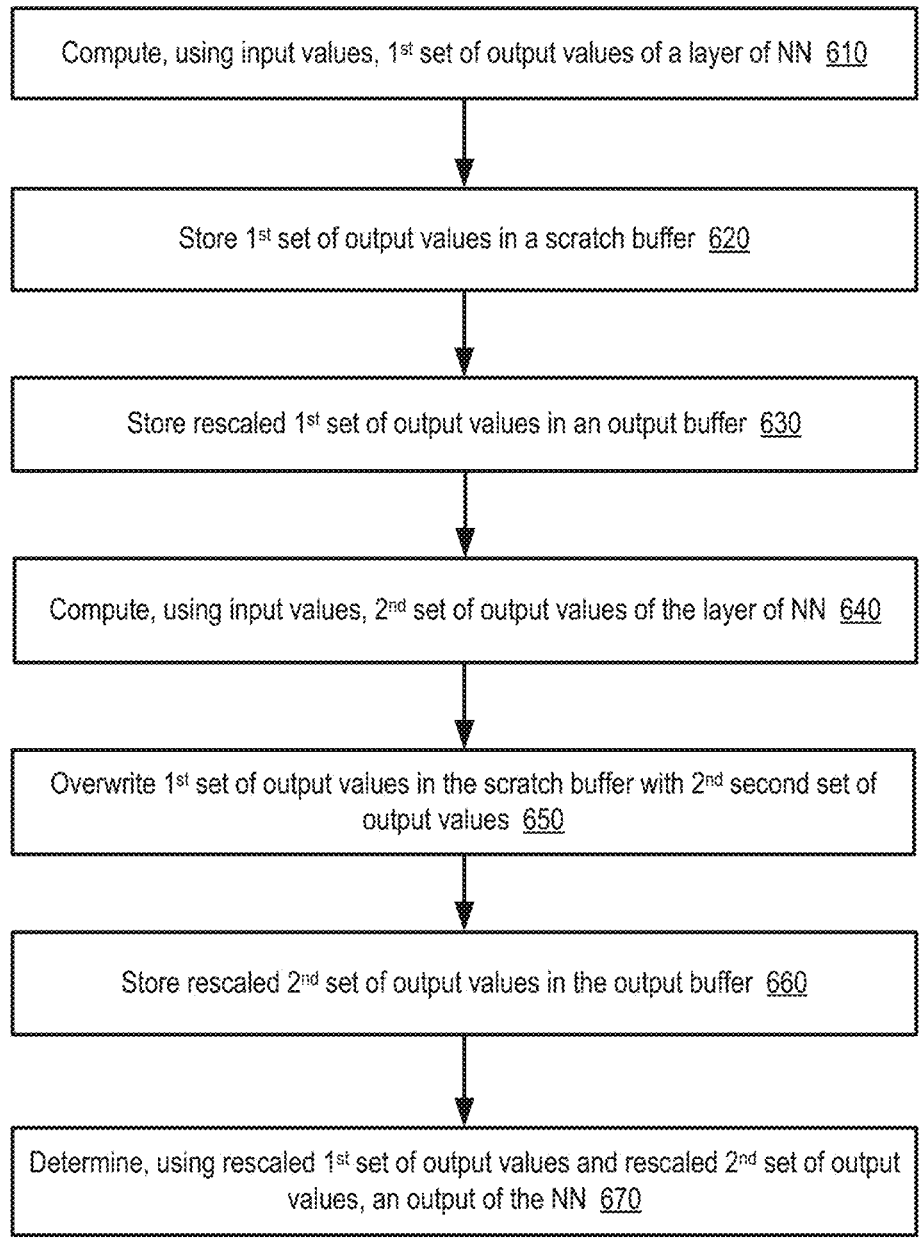
FIG. 6 is a flow diagram of an example method of computation and accumulation of output values for optimization of the size of memory buffers that support neural network operations, in accordance with some implementations of the present disclosure.

FIGS. 5-6 illustrate example methods 500-600 and their possible variations of memory-optimized deployment of MLMs. Methods 500-600 and/or each of their individual functions, routines, subroutines, or operations may be performed by one or more processing units (CPUs, GPUs, field-programmable gate arrays or FPGA, etc.) and memory devices communicatively coupled to the processing units of computing server 102, edge computing device 130, or any other suitable processing device. In certain implementations, a single processing thread or processing core may perform each of methods 500-600. Alternatively, two or more processing threads or cores may perform methods 500-600, each thread executing one or more individual functions, routines, subroutines, or operations of the methods. In an illustrative example, the processing threads or processing cores implementing methods 500-600 may be synchronized (e.g., using semaphores, critical sections, and/or other thread synchronization mechanisms). Alternatively, the processing threads implementing methods 500-600 may be executed asynchronously with respect to each other. Various operations of methods 500-600 may be performed in a different order compared with the order shown in FIGS. 5-6. Some operations of methods 500-600 may be performed concurrently with other operations. Some operations can be optional.

FIG. 5 is a flow diagram of an example method 500 of deploying one or more neural networks for memory-optimized execution of parallel branches of neural connections, in accordance with some implementations of the present disclosure. In some implementations, method 500 may be performed by a processing device of a computing server 102 of FIG. 1. Method 500 may be performed to generate an execution package for deployment of the NN(s) on an edge computing device having limited resources (e.g., edge computing device 130). In some implementations, an edge computing device may include a microcontroller unit with processor speed less than 2.0DMIPS/MHz, such as ARM® Cortex®-M4 or a similar processing device. In some implementations, the processing device of the edge computing device may be a 32-bit processor having a floating point support unit. In some implementations, method 500 of deployment of NN(s) as well subsequent execution of the NN(s) may be performed on the same (e.g., edge) computing device. The processing device of the edge computing device may be communicatively coupled to a memory subsystem, which may include Read-Only Memory (ROM) to store permanent instructions and configuration files for NN execution, random-access memory (RAM) to store configurable instruction files, as well as input and output data, one or more high-speed buffers (e.g., implemented as registers of the processing device and/or cache) to store smaller amounts of input and output data, and the like.

At block 510, method 500 may include accessing an architecture of an NN that is to be deployed. The NN may include a plurality of branches, each of the plurality of branches connecting a branching node and an aggregation node, e.g., as illustrated in FIGS. 2A-D. At least one branch may include one or more intermediate nodes (e.g., nodes 202 and 203 in FIG. 2A, nodes 204-206 in FIG. 2B, etc.). Accessing the NN architecture may include obtaining a graph (or any other representation) of nodes/edges of the NN, identifying a format of inputs into various layers of neurons and individual nodes, and the like. Accessing the NN architecture may further include identifying various portions of the NN that have parallel branches as well as identifying the number of nodes in each parallel branch and determining (or estimating) an amount of data that is input into and output by various nodes of the parallel branches.

At block 520, the processing device performing method 500 may evaluate a plurality of candidate orders of sequential execution of the branches. Each candidate order of sequential execution may use a first buffer (e.g., first buffer 304) to store an output of one or more odd-numbered nodes of a first branch. For example, node B and node C2 in FIG. 3B may be odd-numbered nodes of the first branch B-C1-C2-A, Similarly, nodes B and D2 in FIG. 3C may be odd-numbered nodes of the first branch B-D1-D2-D3-A. Each candidate order may further use a second buffer (e.g., buffer 306) to store an output of one or more even-numbered nodes (e.g., node C1 in FIG. 3B or nodes D1 and D3 in FIG. 3C) of the first branch.

As depicted by the callout portion of FIG. 5, at least some candidate orders of sequential execution may utilize various memory buffers of the edge computing device for storing different data. More specifically, as indicated with block 522, the first buffer or the second buffer may be used to store an output of one or more odd-numbered nodes of a second branch of the plurality of branches. For example, the first buffer 304 or the second buffer 306 may store the outputs of the first node D1 and the third node D3 of the second branch B-D1-D2-D3-A in FIG. 3B. Similarly, the first buffer 304 or the second buffer 306 may store the output of the first node C1 of the second branch B-C1-C2-A in FIG. 3C. In some implementations, as indicated with block 524, at least some candidate orders may use the first buffer to store an output of the branching node (e.g., node B).

In some implementations, as indicated with block 526, at least some candidate orders may use a first scratch buffer (e.g., first scratch buffer 308) to store a copy of the output of the branching node. Additionally, the first scratch buffer may be used to load an input into a first intermediate node (e.g., node D1 in FIG. 3B or node C1 in FIG. 3C) of a second branch of the plurality of branches. In some implementations, as indicated with block 528, at least some candidate orders may use a second scratch buffer (e.g., second scratch buffer 310) to store an output of a last intermediate node of the first branch of the plurality of branches (e.g., node C2 in FIG. 3B or node D3 in FIG. 3C). Additionally, the second scratch buffer may be used to load at least a portion of an input into the aggregation node. For example, second scratch buffer 310 is used to load a portion of the input into aggregation node A in FIG. 3B and FIG. 3C.

At block 530, method 500 may continue with selecting, from the plurality of candidate orders, a preferred order of sequential execution of the plurality of branches. The preferred order may be any order that satisfies selection criteria. In some implementations, the preferred order may be selected in view of a combined minimum size of the first buffer and the second buffer sufficient to support the sequential processing of the plurality of branches, as described in more detail in relation to FIGS. 3A-F. In some implementations, the preferred order may be selected in view of a combined minimum size of the first buffer, the second buffer, and one or more scratch buffers that support the sequential processing of the plurality of branches. For example, the preferred order may be the order that minimizes the combined minimum size of the first buffer, the second buffer, and one or more scratch buffers.

A preferred order of execution may be selected using operations described above. In particular, a number of scratch buffers may be the same or more than the number of parallel branches that have at least one intermediate node. A branch that has no intermediate nodes (e.g., direct connection branch between nodes 201 and 220 in FIG. 2A) may require no additional buffer. Various additional uses for buffers not referenced in conjunction with blocks 520-528 may also be evaluated. For example, various scratch buffers may be used to store intermediate outputs of interrupted (first, second, etc.) branches and may subsequently be used to resume execution of the interrupted branches by providing the intermediate outputs stored in the respective scratch buffers, as described in more detail in conjunction with FIG. 3D.

At block 540, method 500 may continue with generating the execution package for the NN using the preferred order of sequential execution of the plurality of branches. The execution package may specify the total size of all buffers or specific sizes of various buffers (e.g., first, second, scratch buffer(s), etc.) and the order of store (write) and load (read) operations that use these buffers.

FIG. 6 is a flow diagram of an example method 600 of computation and accumulation of output values for optimization of the size of memory buffers that support neural network operations, in accordance with some implementations of the present disclosure. In some implementations, method 600 may be performed by a processing device of an edge computing device. In some implementations, an edge computing device may include a microcontroller unit with processor speed less than 2.0 DMIPS/MHz, such as ARM® Cortex®-M4 or a similar processing device. In some implementations, the processing device of the edge computing device may be a 32-bit processor having a floating point support unit. The processing device may be communicatively coupled to a memory subsystem, which may include a Read-Only Memory (ROM) to store permanent instructions and configuration files for NN execution, random-access memory (RAM) to store configurable instruction files, as well as input and output data, one or more high-speed buffers (e.g., implemented as registers of the processing device and/or cache) to store input and output data, and the like. For example, the buffers may include an input buffer to store a plurality of input values $I_1, I_2, \ldots, I_S$, into a given layer (or multiple layers) of the NN. The buffers may further include a weight buffer to store a plurality of weights $W_{jk}$ of the layers. The buffers may further include an output buffer, to store output values of the nodes/layers of the NN, one or more scratch buffers, accumulator buffers, and the like. In some implementations, different buffers may be implemented as separate hardware devices or circuits. In some implementations, different buffers may be implemented as different logical partitions of the same hardware devices/circuits.

At block 610, the processing device performing method 600 may compute, using the plurality of input values (e.g., $I_1, I_2, \ldots I_S$), a first set of output values of the layer (e.g., $O_1, O_2, \ldots O_{N/M}$) as described in more detail in conjunction with FIG. 4). At block 620, the first set of output values may be stored in a scratch buffer (e.g., scratch buffer 410 in FIG. 4). In some implementations, a size of the scratch buffer may be sufficient to store the first set of output values of the layer, but not the entire output of the layer. At block 630, method 600 may continue with the processing device rescaling (e.g., $O_j \rightarrow O_j R_i$) the first set of output values and storing the rescaled first set of output values in an output buffer (e.g., output buffer 414 in FIG. 4). In some implementations, each of the first set of output values may be in a first integer number format (e.g., 32-bit integer number format, 64-bit integer number format, etc.) and each of the rescaled first set of output values is in a second integer number format (e.g., 8-bit integer number format, 16-bit integer number format, etc.). In some implementations, the processing device may dynamically (at run-time) determine the scaling factor based on the output value(s). For example, the first scaling factor may be determined in view of a size of at least some output values of the first set of output values. In some implementations, the first scaling factor may be determined in view of the size of the scratch buffer and a size of the output buffer. In some implementations, at least some output values of the first set of output values are rescaled using different scaling factors. For example, multiple batches of the output values may be concurrently stored in the scratch buffer, with a first batch being rescaled using one scaling factor, a second batch being rescaled using another scaling factor, and so on. In some implementations, the processing device performing method 600 may store the scaling factor(s) in a scaling factor buffer for use in computations of subsequent layers of the neural network.

At block 640, the processing device performing method 600 may compute, using the plurality of input values, a second (third, fourth, . . . , M-th) set of output values of the layer (e.g., $O_{N/M+1}, O_{N/M+2} \ldots O_{2N/M}$, and so on) of the plurality of input values. At block 650, method 600 may continue with the processing device rescaling (e.g., $O_j \rightarrow O_j R_i$) the second set of output values and storing the rescaled second set of output values in the output buffer, e.g., appending or concatenating the second set of output values to the first set of output values previously stored in the output buffer. The processing device may overwrite the first set of output values in the scratch buffer with the second set of output values. In some implementations, the first set of output values is rescaled using a first scaling factor (e.g., $R_1$) and the second set of output values is rescaled using a second scaling factor (e.g., $R_2$) that is different from the first scaling factor. In some implementations, the second (third, etc.) scaling factor $R_2$ may be the same as the first scaling factor $R_1$.

In some implementations, the second (third, etc.) scaling factor may be different from the first scaling factor. In such implementations, the processing device performing method 600 may store each scaling factor (e.g., in scaling factor buffer) in association with each output number (or a batch of output numbers) to which the scaling factor relates. For example, the scaling factor buffer may store each scaling factor together with the range of memory addresses of the output buffer that store the output values rescaled using this scaling factor.

At block 670, method 600 may continue with determining, using the rescaled first set of output values and the rescaled second (third, etc.) set of output values, an output of the neural network. For example, determining the output of the neuron layer may include performing blocks 610-660 for all or some of the remaining subsets of the input values, e.g., computing the remaining batches of output values, storing the output values in the scratch buffer, rescaling the output values, appending the rescaled output values to the output buffer, storing the scaling factors in the scaling factor buffer, and the like. In some implementations, the plurality of output values may include M sets of output values (including the first set and the second set of output values), and the processing of the M sets of output values in a pipelined fashion. Operations of any additional neuron layers of the NN may then be performed similarly until the output if the entire neural network (e.g., a classification of the input data or any other inference output) is obtained.

Figure 7:
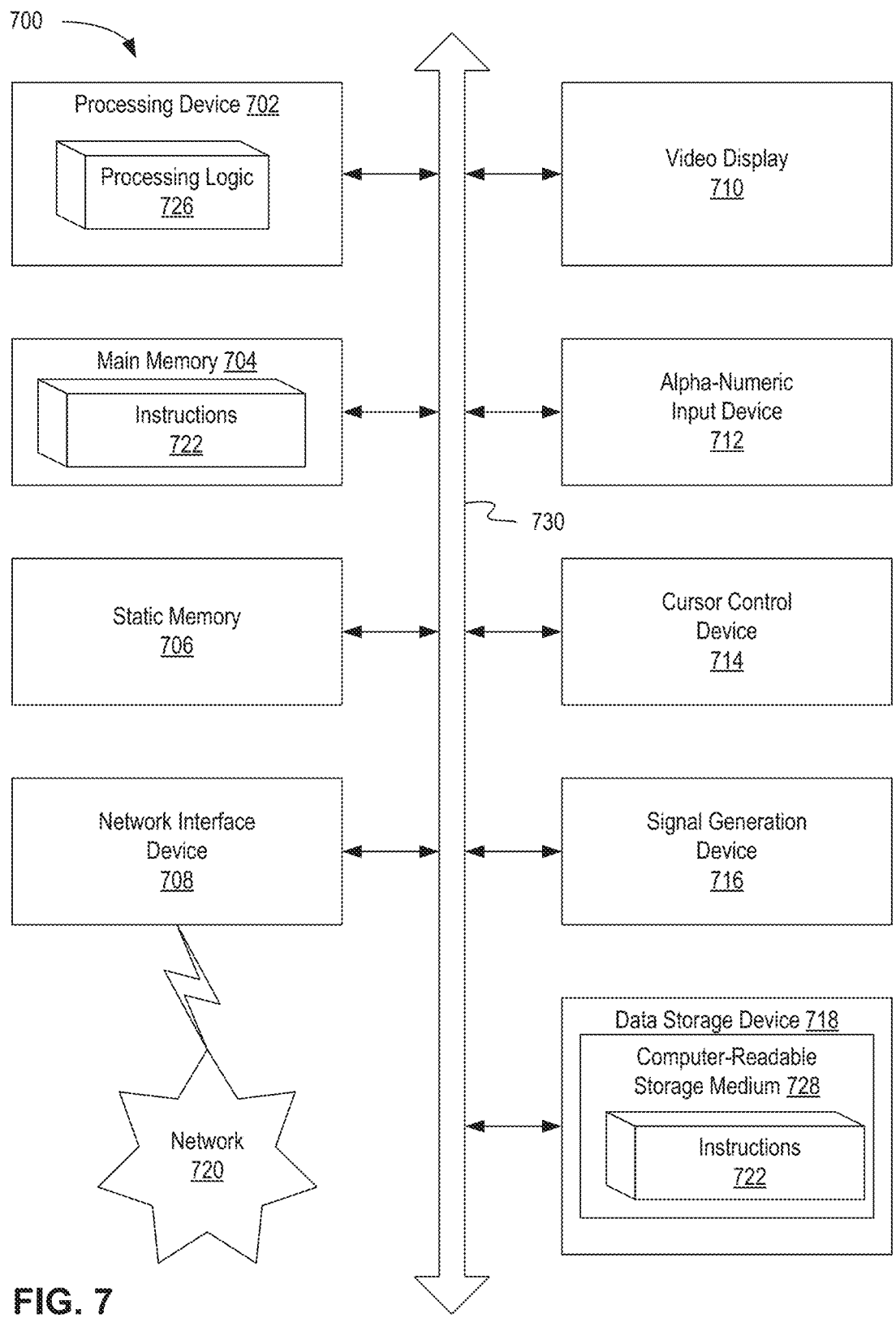
FIG. 7 depicts a block diagram of an example computer system operating in accordance with some implementations of the present disclosure.

FIG. 7 depicts a block diagram of an example computer system 700 operating in accordance with some implementations of the present disclosure. In various illustrative examples, example computer system 700 may be computing server 102 or edge computing device 130, illustrated in FIG. 1. Example computer system 700 may be connected to other computer systems in a LAN, an intranet, an extranet, and/or the Internet. Computer system 700 may operate in the capacity of a server in a client-server network environment. Computer system 700 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 700 may include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processing device 702 represents one or more general-purpose processing devices such as a microprocessor, central processing unit, or the like. More particularly, processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 may be configured to execute instructions implementing method 500 deploying one or more neural networks for memory-optimized execution of parallel branches of neural connections and method 600 of computation and accumulation of output values for optimization of the size of memory buffers that support neural network operations.

Example computer system 700 may further comprise a network interface device 708, which may be communicatively coupled to a network 720. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may comprise executable instructions implementing method 500 deploying one or more neural networks for memory-optimized execution of parallel branches of neural connections and method 600 of computation and accumulation of output values for optimization of the size of memory buffers that support neural network operations.

Executable instructions 722 may also reside, completely or at least partially, within main memory 704 and/or within processing device 702 during execution thereof by example computer system 700, main memory 704 and processing device 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element.

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A system comprising:
   a memory subsystem comprising at least:
      a first buffer and a second buffer; and
   a processing device communicatively coupled to the memory subsystem, the processing device to perform sequential execution of a plurality of parallel branches (PBs) of a neural network, wherein to perform the sequential execution of the plurality of PBs, the processing device is to:
      store outputs of sequential nodes of a first PB of the plurality of PBs alternatively in the first buffer and the second buffer; and
   wherein an order of the sequential execution of the plurality of PBs is determined to reduce a combined size of the memory subsystem sufficient to support the sequential execution of the plurality of PBs.

2. The system of claim 1, wherein to perform the sequential execution of the plurality of PBs, the processing device is further to:
   store outputs of sequential nodes of a second PB of the plurality of PBs alternatively in the first buffer and the second buffer.

3. The system of claim 1, wherein the first PB and a second PB of the plurality of PBs begin at a branching node, and wherein the memory subsystem further comprises a third buffer, and wherein to perform the sequential execution of the plurality of PBs, the processing device is to:
   store an output of the branching node in each of the first buffer and the third buffer.

4. The system of claim 3, wherein the memory subsystem further comprises a fourth buffer, and wherein to perform the sequential execution of the plurality of PBs, the processing device is further to:
   store, in the fourth buffer, an output of an intermediate node of the first PB.

5. The system of claim 4, wherein the first PB and the second PB merge at an aggregation node, and wherein to perform the sequential execution of the plurality of PBs, the processing device is further to:
   load, from the third buffer, an input into an intermediate node of the second PB; and
   load, from the fourth buffer, at least a portion of an input into the aggregation node.

6. The system of claim 3, wherein the memory subsystem further comprises a fourth buffer, and wherein to perform the sequential execution of the plurality of PBs, the processing device is further to:
   interrupt execution of the PB;
   store, in the fourth buffer, an intermediate output of the interrupted first PB;
   execute, using the output of the branching node stored in the third buffer, at least a portion of the second PB; and
   resume execution of the first PB using the intermediate output stored in the fourth buffer.

7. The system of claim 1, wherein the memory subsystem further comprises:
   a plurality of scratch buffers to store intermediate outputs of the plurality of PBs.

8. The system of claim 7, wherein the plurality of scratch buffers comprises a number of scratch buffers that is at least a number of PBs having at least one intermediate node.

9. A system comprising:
   a memory subsystem comprising:
      a scratch buffer; and
      an output buffer; and
   a processing device communicatively coupled to the memory subsystem, the processing device to:
      store a first set of output values of a layer of a neural network in the scratch buffer;
      store a rescaled first set of output values in the output buffer;
      compute a second set of output values of the layer;
      replace the first set of output values in the scratch buffer with a second set of output values of the layer;
      store a rescaled second set of output values in the output buffer; and
      determine, using the rescaled first set of output values and the rescaled second set of output values, an output of the neural network.

10. The system of claim 9, wherein the first set of output values is rescaled using a first scaling factor and the second set of output values is rescaled using a second scaling factor that is different from the first scaling factor.

11. The system of claim 10, wherein the first scaling factor is determined in view of a size of at least some output values of the first set of output values.

12. The system of claim 10, wherein the first scaling factor is determined in view of a size of the scratch buffer and a size of the output buffer.

13. The system of claim 10, wherein at least some output values of the first set of output values are rescaled using different scaling factors.

14. The system of claim 9, wherein the processing device is further to compute M sets of output values including the first set of output values and the second set of output values, and wherein the processing device is to perform pipelined processing of the M sets of output values and determine one or more scaling factors for each of the M sets of output values.

15. The system of claim 14, wherein the processing device further comprises a scaling factor buffer to:
store each of the one or more scaling factors for each of the M sets of output values.

16. The system of claim 9, wherein each of the first set of output values is in a first integer number format and each of the rescaled first set of output values is in a second integer number format.

17. A method to generate an execution package associated with a neural network (NN), the method comprising:
evaluating a plurality of candidate orders of sequential execution of a plurality of parallel branches (PBs) of the NN, wherein each candidate order of the sequential execution stores outputs of sequential nodes of a first PB of the plurality of PBs alternatively in a first buffer and a second buffer;
selecting, from the plurality of candidate orders, a target order of the sequential execution of the plurality of PBs in view of a combined size of a memory system sufficient to support the sequential execution of the plurality of PBs, the memory system comprising the first buffer and the second buffer; and
generating the execution package for the NN comprising the selected target order of the sequential execution of the plurality of PBs.

18. The method of claim 17, wherein each candidate order of the sequential execution stores outputs of sequential nodes of a second PB of the plurality of PBs alternatively in the first buffer and the second buffer.

19. The method of claim 17, wherein the memory system further comprises a third buffer, wherein the first PB and a second PB of the plurality of PBs begin at a branching node, and wherein each candidate order of the sequential execution stores an output of the branching node in each of the first buffer and the third buffer.

20. The method of claim 19, wherein the first PB and the second PB merge at an aggregation node, wherein the memory system further comprises a fourth buffer, and wherein each candidate order of the sequential execution:
loads an input into a first intermediate node of the second PB from the third buffer;
stores an output of a last intermediate node of the first PB in the fourth buffer; and
loads at least a portion of an input into the aggregation node from the fourth buffer.

* * * * *